(12) United States Patent
Braband et al.

(10) Patent No.: US 11,465,658 B2
(45) Date of Patent: Oct. 11, 2022

(54) METHOD AND SYSTEM FOR IDENTIFYING OBSTACLES IN A DANGER ZONE IN FRONT OF A RAIL VEHICLE

(71) Applicant: SIEMENS MOBILITY GMBH, Munich (DE)

(72) Inventors: Jens Braband, Braunschweig (DE); Bernhard Evers, Braunschweig (DE)

(73) Assignee: Siemens Mobility GmbH, Munich (DE)

( * ) Notice: Subject to any disclaimer, the term of this patent is extended or adjusted under 35 U.S.C. 154(b) by 279 days.

(21) Appl. No.: 16/088,862

(22) PCT Filed: Mar. 1, 2017

(86) PCT No.: PCT/EP2017/054759
§ 371 (c)(1),
(2) Date: Sep. 27, 2018

(87) PCT Pub. No.: WO2017/167530
PCT Pub. Date: Oct. 5, 2017

(65) Prior Publication Data
US 2020/0276995 A1 Sep. 3, 2020

(30) Foreign Application Priority Data

Mar. 31, 2016 (DE) .......................... 102016205339.6

(51) Int. Cl.
*B61L 23/04* (2006.01)
*B61L 3/00* (2006.01)
(Continued)

(52) U.S. Cl.
CPC ............ *B61L 23/041* (2013.01); *B61L 3/002* (2013.01); *B61L 27/16* (2022.01); *G06V 20/58* (2022.01)

(58) Field of Classification Search
CPC .... B61L 23/041; B61L 3/002; B61L 27/0027; G06K 9/00805
See application file for complete search history.

(56) References Cited

U.S. PATENT DOCUMENTS 6,129,025 A * 10/2000 Minakami ............... B60L 13/03
104/88.01
6,163,755 A * 12/2000 Peer ...................... B61L 23/041
701/301

(Continued)

FOREIGN PATENT DOCUMENTS

CN 1214656 A 4/1999
CN 202124050 U 1/2012
(Continued)

OTHER PUBLICATIONS

JP-2014225220-A translation (Year: 2014).*
(Continued)

*Primary Examiner* — Jeff A Burke
*Assistant Examiner* — Kyle T Johnson
(74) *Attorney, Agent, or Firm* — Laurence A. Greenberg; Werner H. Stemer; Ralph E. Locher

(57) ABSTRACT

A method uses a track-side obstacle identification arrangement and a vehicle-side obstacle identification arrangement in order to identify obstacles in a danger zone in front of a rail vehicle. In order to allow improved autonomous driving of the rail vehicle, it is provided that, as it approaches a relevant one of the obstacles, at least one reaction or response of the rail vehicle is derived depending on an evaluation signal of the track-side obstacle identification arrangement and an actual value of at least one variable which characterizes the effectiveness or performance of the vehicle-side obstacle identification arrangement. A system for identifying obstacles is also provided.

19 Claims, 2 Drawing Sheets

(51) Int. Cl.
*G06V 20/58* (2022.01)
*B61L 27/16* (2022.01)

(56) References Cited

U.S. PATENT DOCUMENTS

| | | | |
|---|---|---|---|
| 7,409,295 B2* | 8/2008 | Paradie | G06T 7/70 |
| | | | 701/301 |
| 8,605,947 B2* | 12/2013 | Zhang | G08G 1/167 |
| | | | 382/104 |
| 9,533,626 B2 | 1/2017 | Forni et al. | |
| 11,079,768 B2* | 8/2021 | Ferguson | G05D 1/0253 |
| 2011/0243455 A1* | 10/2011 | Miyajima | G01C 21/3602 |
| | | | 382/201 |
| 2013/0136306 A1* | 5/2013 | Li | G06K 9/2036 |
| | | | 382/103 |
| 2014/0218482 A1* | 8/2014 | Prince | B61L 29/30 |
| | | | 348/47 |
| 2015/0343948 A1* | 12/2015 | Miyagawa | G06K 9/00805 |
| | | | 348/148 |
| 2015/0348270 A1* | 12/2015 | Branz | G06K 9/2054 |
| | | | 701/70 |
| 2016/0059853 A1* | 3/2016 | Yamakoshi | B60W 10/18 |
| | | | 701/36 |
| 2016/0152253 A1* | 6/2016 | Katz | B61L 23/00 |
| | | | 246/167 R |
| 2017/0262715 A1* | 9/2017 | Kozuka | G08G 1/166 |
| 2017/0300765 A1* | 10/2017 | Dojcinovic | G06T 7/215 |
| 2018/0314921 A1* | 11/2018 | Mercep | G01S 13/87 |
| 2018/0340801 A1* | 11/2018 | Kelley | B61L 25/021 |
| 2018/0372866 A1* | 12/2018 | Baba | G01V 8/10 |
| 2019/0114914 A1* | 4/2019 | Gao | B61L 3/008 |
| 2020/0189633 A1* | 6/2020 | Green | B61L 23/041 |
| 2020/0276995 A1* | 9/2020 | Braband | G06K 9/00805 |

FOREIGN PATENT DOCUMENTS

| | | | | |
|---|---|---|---|---|
| CN | 104331910 A | 2/2015 | | |
| CN | 104627205 A | 5/2015 | | |
| DE | 102015212019 A1 | 7/2016 | | |
| JP | 2014225220 A | * 12/2014 | | G06V 20/58 |
| KR | 20070120311 A | 12/2007 | | |
| WO | 2010122039 A1 | 10/2010 | | |
| WO | 2013045315 A1 | 4/2013 | | |
| WO | 2015015494 A1 | 2/2015 | | |

OTHER PUBLICATIONS

Xiang, Rong et al: "Fast Over-the-Horizon Obstacle Detection Algorithm for Locomotive", Natural Science Journal of Xiangtan University, vol. 35, No. 2, Jun. 2013, Jun. 30, 2013, pp. 103-108.

* cited by examiner

METHOD AND SYSTEM FOR IDENTIFYING OBSTACLES IN A DANGER ZONE IN FRONT OF A RAIL VEHICLE

BACKGROUND OF THE INVENTION

Field of the Invention

Both track-side and also vehicle-side obstacle identification arrangements by means of which obstacles in a danger zone in front of a rail vehicle can be identified are known.

Vehicle-side obstacle identification arrangements typically lack a sufficient forward view. Track-side obstacle identification arrangements often do not have sufficient resolution or they lack a correct classification of an individual obstacle. Inter alia, the implementation of autonomous driving of rail vehicles currently fails on routes characterized by mixed traffic which are traveled over by goods trains and high speed trains.

The invention relates to a method in which a track-side obstacle identification arrangement and a vehicle-side obstacle identification arrangement are used in order to identify obstacles in a danger zone in front of a rail vehicle.

The invention also relates to a system in which a track-side obstacle identification arrangement and a vehicle-side obstacle identification arrangement are suitably configured to identify obstacles in a danger zone in front of a rail vehicle.

A method of this type and a system of this type are known from the German patent application 102015212019.8.

SUMMARY OF THE INVENTION

It is an object of the invention to provide a method and a system of the aforementioned type which enable an improved autonomous driving of the rail vehicle or of rail vehicles.

This object is achieved by means of a method in which, on approaching a relevant item of the obstacles, at least one reaction of the rail vehicle dependent upon an evaluation signal of the track-side obstacle identification arrangement and an actual value of at least one variable characterizing the effectiveness of the vehicle-side obstacle identification arrangement is derived.

This object is also achieved in a corresponding manner by means of a system which is suitably configured to derive, on approaching a relevant item of the obstacles, at least one reaction of the rail vehicle dependent upon an evaluation signal of the track-side obstacle identification arrangement and an actual value of at least one variable characterizing the effectiveness of the vehicle-side obstacle identification arrangement.

The inventive method and the inventive system offer the advantage that they enable an optimized hybridized and dynamic cooperation of the track-side obstacle identification arrangement and of the vehicle-side obstacle identification arrangement and therefore an autonomous driving of rail vehicles at an optimized speed.

According to the method, it is regarded as advantageous if as the reaction, a control signal is determined for adapting a driving behavior of the rail vehicle.

Alternatively or additionally, as a further reaction, a status signal can be determined.

Accordingly, it is regarded as advantageous if the inventive system is suitably configured to determine as the reaction a control signal for adapting a driving behavior of the rail vehicle. Alternatively or additionally, the system can suitably be configured to determine a status signal as a further reaction.

The track-side evaluation signal can be formed from a track-side obstacle signal indicating the obstacle and a vehicle-side evaluation signal can be formed from a vehicle-side obstacle signal indicating the obstacle. According to the method, it is advantageous for the optimized implementation of the hybridized and dynamic cooperation of the track-side obstacle identification arrangement and the vehicle-side obstacle identification arrangement if the control signal is also formed dependent upon the vehicle-side evaluation signal.

Correspondingly, it is advantageous according to the system if the track-side obstacle identification arrangement is suitably configured such that the track-side evaluation signal is suitably formed from a track-side obstacle signal indicating the obstacle if the vehicle-side obstacle identification arrangement is suitably configured to form a vehicle-side evaluation signal from a vehicle-side obstacle signal indicating the obstacle and if the system is suitably configured also to form the control signal dependent upon the vehicle-side evaluation signal.

In the inventive method, the actual value is preferably determined dependent upon an information item concerning the type of the vehicle-side obstacle identification arrangement. Alternatively or additionally, the actual value and/or a target value of the at least one variable characterizing the effectiveness of the vehicle-side obstacle identification arrangement are determined dependent upon an information item concerning the existing environment-related visibility at the actual location of the rail vehicle.

Furthermore, it is considered advantageous if on the basis of the track-side evaluation signal, a track-side information item concerning the type of obstacle is provided and if the actual value and/or the control signal are determined dependent upon the track-side information item relating to the type of the obstacle.

Furthermore, it is considered advantageous if on the basis of the track-side evaluation signal, a track-side information item concerning the location of the obstacle is provided and if the control signal is determined dependent upon the track-side information item relating to the location of the obstacle.

Preferably, the track-side evaluation signal is transferred by means of a track-side transfer arrangement from a communication unit of the track-side obstacle identification arrangement to a communication unit of the rail vehicle. And correspondingly, according to the system, a track-side transfer arrangement which is suitably configured to transfer the track-side evaluation signal from a communication unit of the track-side obstacle identification arrangement to a communication unit of the rail vehicle is regarded as advantageous.

According to the method, it is also regarded as advantageous if a driving control device of the rail vehicle receives the control signal and adapts the driving behavior of the rail vehicle according to the control signal. Accordingly, it is advantageous according to the system if a driving control device of the rail vehicle is suitably configured to receive the control signal and to adapt the driving behavior of the rail vehicle according to the control signal.

BRIEF DESCRIPTION OF THE SEVERAL VIEWS OF THE DRAWING

The invention is described in greater detail below making reference to the drawings, in which.

DESCRIPTION OF THE INVENTION

Figure 1:
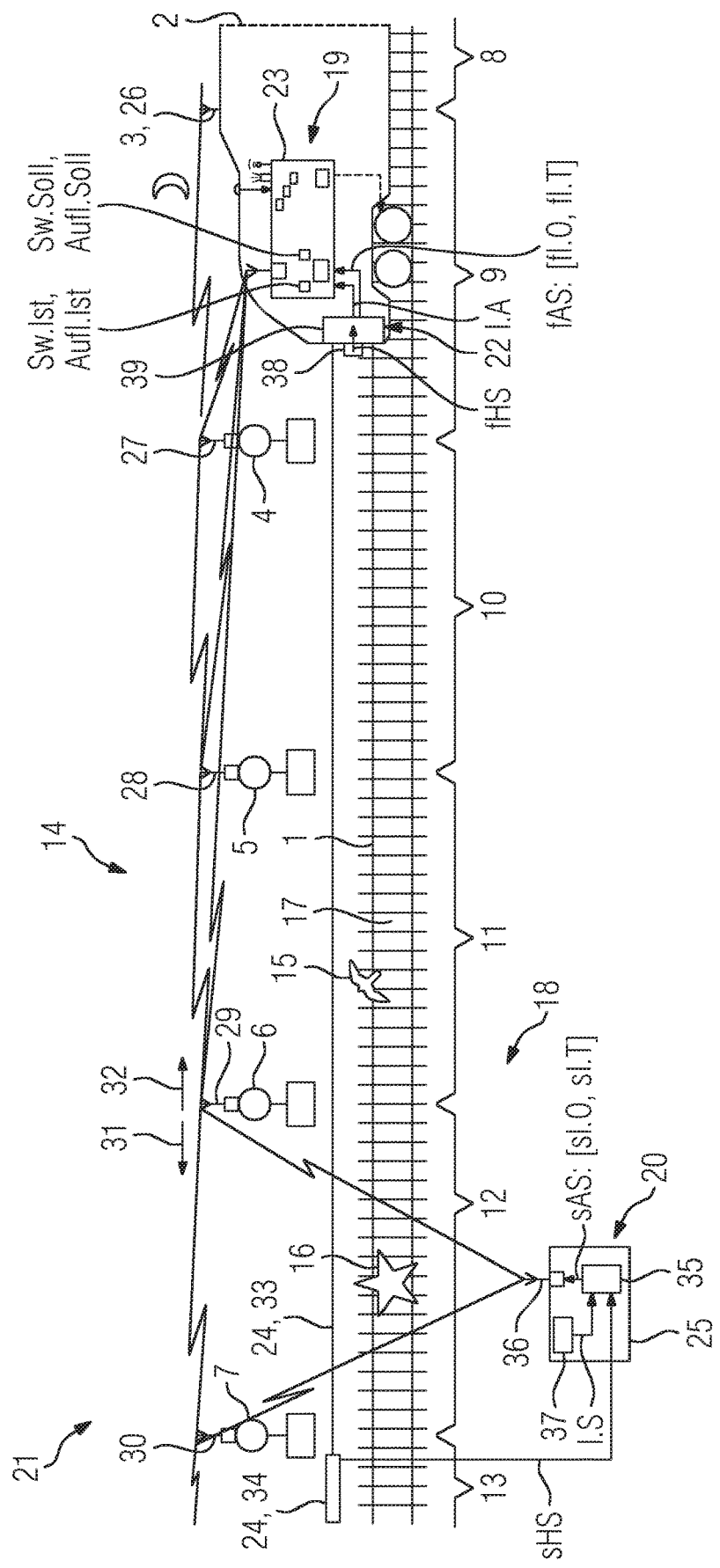
FIG. 1 shows a rail vehicle on a track and an inventive system for recognizing obstacles in a danger zone of the track in front of the rail vehicle.
Figure 2:
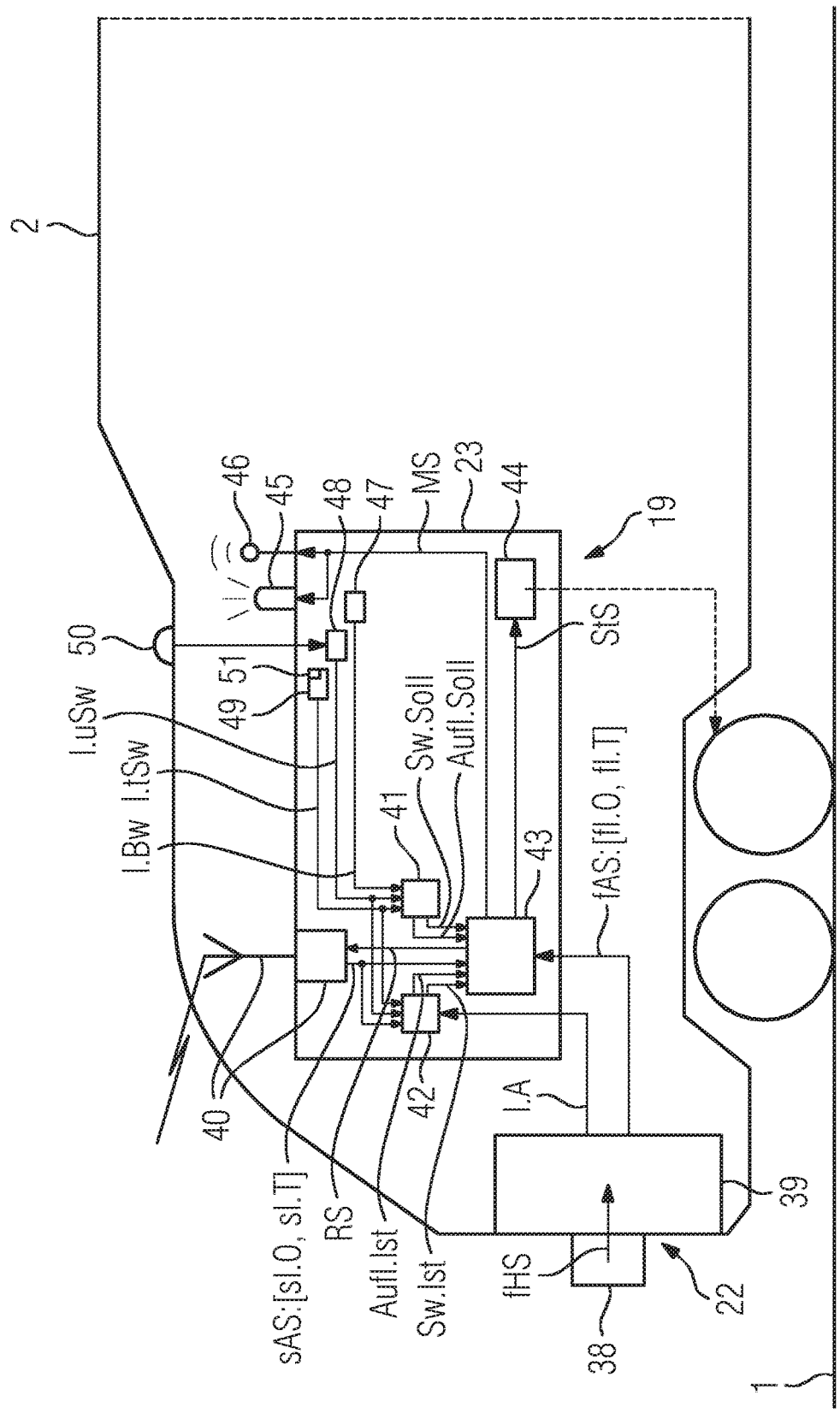
FIG. 2 shows the rail vehicle of FIG. 1.

FIG. 1 shows a track 1 with a rail vehicle 2, wherein this is in particular a rail vehicle driving automatically without a traction vehicle driver.

The track 1 is equipped with signals 3, 4, 5, 6, 7—here in the form of light signals—wherein the signals delimit track portions 8, 9, 10, 11, 12, 13 of the track.

FIG. 1 also shows a preferred embodiment 14 of the inventive system for identifying obstacles 15, 16 in a danger zone 17 of the track in front of the rail vehicle.

The system 14 comprises a track-side equipment set 18 (track equipment) and a vehicle-side equipment set 19 (vehicle equipment). The track equipment 18 comprises a track-side obstacle identification arrangement 20 and a track-side transfer arrangement 21. The vehicle equipment 19 comprises a vehicle-side obstacle identification arrangement 22 and a vehicle control arrangement 23.

The track-side obstacle identification arrangement 20 is an arrangement continuously sensing the track 1 for obstacle identification—it has a track-side sensor device 24 and a track-side evaluating device 25.

The track-side transfer arrangement 21 comprises communication units 26, 27, 28, 29, 30 and possibly repeaters (not shown here).

The communication units 26, 27, 28, 29, 30 are mounted on the signals 3, 4, 5, 6, 7. In the preferred embodiment 14 of the inventive system as shown, communication units known from Car2X technology are used which operate in the 5.9 GHz range. The communication units 26, 27, 28, 29, 30 can transmit and receive in both directions 31, 32 of the track. The transmitting and receiving can take place reactionlessly. Furthermore, the transmission and reception, for example, by means of feeding in the signal current of the signals 3, 4, 5, 6, 7 or a current generated by solar modules can take place independently with regard to energy.

Wherever there is no direct connection between the communication units 26, 27, 28, 29, 30 mounted on the signals, repeaters are installed or other media are used, so that the communication units 26, 27, 28, 29, 30 are connected from the signaling standpoint to form the transfer arrangement 21.

In the embodiment 14 of the inventive system as shown, for example, a so-called Fiber Optic Distributed Sensor Technique, in particular a Distributed Acoustic Sensor Technique, is used as the track-side obstacle identification arrangement 20. Alternatively or additionally, however, other track-side obstacle identification arrangements or hybridized arrangements of different track-side obstacle identification arrangements are also usable.

The sensor device 24 comprises a glass fiber strand 33 with a transmitting and receiving unit 34 attached laid along the track 1 in the danger zone 17. Signals received by the transmitting and receiving unit 34 are transferred as track-side obstacle signals sHS to the evaluating device 25.

The track-side evaluating device 25 is provided with an evaluating unit 35, a communication unit 36 and a track map unit 37, wherein the track map unit 37 has a rough map of the track.

In the evaluating unit 35, the track-side obstacle signals sHS are evaluated by means of filter algorithms.

If, by means of the evaluating unit 35 of the track-side obstacle identification arrangement, an obstacle (an event) is identified, this is classified by the evaluating unit 35. Herein, the type of obstacle is determined by means of pattern recognition. Depending on the type, different reactions are initiated. Furthermore, by calling upon information items I.S concerning the track portions and the signals delimiting the track portions which the evaluating unit 34 reads from the track map unit 36, a respective instance of the obstacles (events) is assigned to the track portion affected. If the respective obstacle (event) is relevant, the evaluating unit 35 transmits a track-side evaluation signal sAS:[sI.O, sI.T] via the communication unit 36. The evaluation signal sAS:[sI.O, sI.T] is notified to the communication units 29, 30 of the track-side communication arrangement which is mounted on the signals 6, 7 which delimit the track portion 12 in which the relevant obstacle (event) 16 was identified.

With regard to the bird 15 shown over the track portion 12 which the track-side obstacle identification arrangement identifies as such, the evaluating unit 35 does not output an evaluation signal since it classifies the bird as an obstacle of a non-relevant type. With regard to the obstacle marked as 16, the evaluating unit outputs the evaluation signal sAS: [sI.O, sI.T] since it classifies this as an obstacle of a relevant type.

The communication units 26, 27, 28, 29, 30 mounted on the signals coordinate among themselves so that the communication unit of each of the signals knows the events in both directions 31, 32 at a distance of approximately 3 km.

The track-side sensor device 24 therefore identifies a respective instance 15 or 16 of the obstacles 15, 16 and outputs a track-side obstacle signal sHS indicating each obstacle 15 or 16 to the evaluating device 25. And from the track-side obstacle signals sHS, the evaluating device 25 forms the track-side evaluation signal sAS:[sI.O, sI.T] and outputs it by means of its communication unit 36 to the track-side transfer arrangement 21 for transfer to the rail vehicle 2.

Herein, on the basis of the track-side evaluation signal sAS:[sI.O, sI.T] a track-side information item sI.T is provided concerning the type of the relevant obstacle 16 and a track-side information item sI.O concerning the location of the relevant obstacle 16.

The rail vehicle 2 approaching the signal denoted here as 4 receives the information items relevant for the rail vehicle from the next three portions 10, 11, 12. If needed, a portion of the track map can also be transferred. In the same way, events that have completed can be withdrawn.

The vehicle-side obstacle identification arrangement 22 comprises a vehicle-side sensor device 38 and a vehicle-side evaluating device 39.

The vehicle control arrangement 23 comprises a communication unit 40 which is suitably configured to receive the track-side evaluation signal sAS:[sI.O, sI.T] from the track-side transfer arrangement 21.

The vehicle control arrangement 23 also comprises a target value determination device 41, an actual value determination device 42 and a control device 43.

Furthermore, the vehicle control arrangement 23 comprises a driving control device 44 in the form of a drive and braking device, a warning device 45—here in the form of a horn—and an alerting device 46—here in the form of a means for alerting servicing personnel.

Furthermore, the vehicle control arrangement 23 comprises a device 47 for outputting an information item I.Bw concerning the current stopping distance of the rail vehicle, a device 48 for outputting an information item I.uSw concerning the environment-related visibility prevailing at the current location of the rail vehicle and a device 49 for outputting an information item I.tSw concerning the topological visibility prevailing at the current location of the rail vehicle. The environment-related visibility can be restricted, for example, by fog or darkness. The topological visibility can be restricted, for example, by curves or inclines.

The device 48 is connected, for example, to a brightness sensor 50. The device 49 has access to a track atlas 51 which comprises a component describing the topology of the track.

On approaching the obstacle 16, reactions of the rail vehicle 2 are derived dependent upon the evaluation signal sAS:[sI.O, sI.T] of the track-side obstacle identification arrangement 20 and dependent upon at least one of the actual values identified here as Sw.Ist and Aufl.Ist, and in each case a variable characterizing the effectiveness of the vehicle-side obstacle identification arrangement 22.

One of the derived reactions consists therein that the control device 43 determines a control signal StS for adapting a driving behavior of the rail vehicle 2 and outputs this control signal to the driving control device 44 which then adapts the driving behavior of the rail vehicle according to the control signal StS.

A further reaction lies therein that the control device 43 determines a status signal MS and outputs it to the warning device 45 and to the alerting device 46.

The control device 43 forms the control signal StS dependent upon a series of values and information items.

Thus, for automatic driving without a traction vehicle driver, apart from the at least one actual value Sw.Ist or Aufl.Ist, an associated target value Sw.Soll or Aufl.Soll of the at least one variable characterizing the effectiveness of the vehicle-side obstacle identification arrangement is output to the control device 43. Alternatively thereto, both the actual values and both the target values can also be output to the control device 43.

The control device 43 then determines the deviation A.Sw=Sw.Ist—Sw.Soll and/or the deviation A.Ausl.=Ausl.Ist—Ausl.Soll of the respective actual value from the associated target value, so that the reactions—that is the control signal StS and the status signal MS—are determined dependent upon the track-side evaluation signal sAS:[sI.O, sI.T] and dependent upon the determined deviation A.Sw and/or the determined deviation A.Ausl.

Furthermore, the control device 43 also determines the control signal StS, dependent upon the track-side information item sI.T concerning the type of the obstacle 16 and dependent upon the track-side information item sI.O concerning the location of the obstacle 16.

Furthermore, the control device 43 also forms the control signal StS dependent upon a vehicle-side evaluation signal fAS:[fI.O, fI.T]. For this purpose, the sensor device 38 of the vehicle-side obstacle identification arrangement 22—as soon as it identifies the obstacle 16—forms a vehicle-side obstacle signal fHS indicating the obstacle 16 and outputs it to the evaluating device 39. The evaluating device 39 then forms the vehicle-side evaluation signal fAS:[fI.O, fI.T] from the vehicle-side obstacle signal fHS and outputs it to the control device 43. The vehicle-side evaluating device 39 also outputs an information item I.A concerning the type of the obstacle identification arrangement 22.

As the actual value, in particular, a value Sw.Ist corresponding to the actually prevailing technical visual range (that is, an actually existing sensor range) of the obstacle identification arrangement 22 is determined by the actual value determination device 42 and accordingly, a value Sw.Soll corresponding to the currently required technical visibility is provided by the target value determination device 41 as the target value for obstacle identification (that is, the actually required sensor range for obstacle identification).

Alternatively or additionally, a value Aufl.Ist corresponding to the actual prevailing technical resolution of the obstacle identification arrangement 22 is determined by the actual value determination device as the actual value and accordingly, a value Aufl.Soll corresponding to the currently required technical resolution is provided by the target value determination device 41 as the actual value for obstacle identification.

In particular, the value Sw.Ist of the actual prevailing technical visibility is determined by the actual value determination device dependent upon the information I.A concerning the type of the obstacle recognition device 22, the track-side information item sI.T concerning the type of the obstacle 16, the information item I.uSw concerning the environment-related visibility prevailing at the actual location of the rail vehicle 2 and the information item I.tSw concerning the topological visibility prevailing at the actual location of the rail vehicle are determined, and are output to the control device 43.

The value Sw.Soll of the actually required technical visibility is determined by the target value determination device, preferably dependent upon the information item I.Bw concerning the current stopping distance of the rail vehicle, the information item I.uSw concerning the environment-related visibility at the current location of the rail vehicle and the information item I.tSw concerning the topological visibility prevailing at the current location of the rail vehicle are determined and are output to the control device 43.

The value Sw.Soll herein forms the actual location-related minimum of the required technical visibility for obstacle identification and is used as a definition for the actual prevailing technical visibility of the vehicle-side obstacle identification arrangement and its sensor device (sensor technology, for example in the form of a radar system, a camera system, etc.) for track observation.

If the value of the prevailing technical visual range of the obstacle identification arrangement 22 is greater than or equal to the currently required value of the technical visibility for obstacle identification (A.Sw≥0), then the rail vehicle 2 can be operated at the maximum permissible speed.

If the value of the actual prevailing technical visibility of the obstacle identification arrangement 22 is smaller than the currently required value of the technical visibility for obstacle identification (A.Sw<0), then the rail vehicle 2 must drive slower. By means of the control signal StS, preferably through a dynamic braking curve adaptation, a restriction of the speed of the rail vehicle 2 is carried out such that stopping before the obstacle 16 would be possible.

In particular, from the determination of the value Sw.Soll of the currently required technical visibility for obstacle identification on the basis of the aforementioned information items I.Bw, I.uSw, I.tSw as a pre-determined minimum for the technical visibility (as a pre-determined minimum for the sensor range), a series of advantages results.

Thus, the value Sw.Soll represents a measure for the required safety of the system 14 and, in particular, of its vehicle-side obstacle identification arrangement 22 and thus for its admissibility for automatic driving.

The system availability during automatic driving is increased since a dynamic braking curve adaptation based on a defined safety requirement enables driving of the rail vehicle 2, even during poor environmental conditions and in topological conditions which worsen the visibility, and the rail vehicle does not necessarily have to be stopped.

There therefore exists freedom from interference in relation to existing train control systems.

The value Sw.Soll serves as the stipulation of a design criterion for the sensor system for automatic driving.

Also, the inventive method and the inventive system offer the advantage that operational and environment-related boundary conditions can be defined and their implementation can be realized by determining the target value as a definition for the effectiveness of the obstacle identification arrangement 22 for the track observation, wherein the definition adapts dynamically to the existing track conditions and is therein at least as good as the effectiveness of a traction vehicle driver under the same boundary conditions.

The obstacle identification arrangement 22 of the rail vehicle 2 has a specific effectiveness according to its type, the actual environmental conditions, the actual topological conditions and the specific effectiveness corresponding to the type of a respective obstacle with regard to its visual range and also a specific effectiveness with regard to its resolution.

In each case, the rail vehicle 2 dynamically adapts its driving behavior dependent upon the information item sI.O concerning the location of the obstacle (and thus dependent upon its distance from the obstacle), dependent upon the information item sI.T concerning the type of the obstacle and dependent upon the deviation of the actual value from the target value (and thus dependent upon the actually existing effectiveness of the vehicle-side obstacle identification arrangement 22 and the currently required effectiveness for obstacle identification), recognizes and classifies the obstacle 16 from afar and initiates the corresponding reactions, e.g. hooting or alerting the service personnel. In most cases, the obstacle, e.g. a large animal or a human disappears or can be driven away. In this case, the rail vehicle 2 notifies the cleared status with a corresponding reverse signal RS to the communication unit of the next signal that it passes.

Whereas during conventional operation, the track has to be closed and cleared after identification of an obstacle, the inventive system 14 enables automatic driving of the rail vehicle 2 at an optimum speed.

The invention claimed is:

1. A method for identifying obstacles in a danger zone in front of a rail vehicle, the method comprising the following steps:
   outputting a track-side evaluation signal from a track-side obstacle identification arrangement;
   outputting, from a vehicle-side evaluating device of a vehicle-side obstacle identification arrangement, an information item indicating a type of the vehicle-side obstacle identification arrangement;
   upon approaching a relevant one of the obstacles, deriving, with the vehicle-side obstacle identification arrangement, at least one reaction of the rail vehicle in dependence on a track-side evaluation signal of the track-side obstacle identification arrangement and an actual value of at least one variable characterizing an effectiveness of the vehicle-side obstacle identification arrangement, wherein the at least one reaction of the rail vehicle is selected from the group consisting of determining and outputting a control signal to a driving control device to adapt a driving behavior of the rail vehicle based on the control signal; and determining and outputting a status signal to at least one component selected from the group consisting of a warning device and an alerting device;
   determining the actual value in dependence on the information item indicating the type of the vehicle-side obstacle identification arrangement;
   outputting, to the driving control device, the actual value and an associated target value of the at least one variable characterizing the effectiveness of the vehicle-side obstacle identification arrangement; and
   determining, with the driving control device, a deviation of the actual value from the associated target value, wherein the at least one reaction of the rail vehicle is determined dependent on the trackside evaluation signal and on the deviation.

2. The method according to claim 1, which further comprises determining a control signal as the reaction for adapting a driving behavior of the rail vehicle.

3. The method according to claim 2, which further comprises forming a vehicle-side evaluation signal from a vehicle-side obstacle signal indicating the obstacle.

4. The method according to claim 3, which further comprises forming the control signal in dependence on the vehicle-side evaluation signal.

5. The method according to claim 2, which further comprises:
   providing a track-side information item concerning a type of the obstacle based on the track-side evaluation signal; and
   determining at least one of the actual value or the control signal in dependence on the track-side information item concerning the type of the obstacle.

6. The method according to claim 2, which further comprises:
   providing a track-side information item concerning a location of the obstacle based on the track-side evaluation signal; and
   determining the control signal in dependence on the track-side information item concerning the location of the obstacle.

7. The method according to claim 2, which further comprises using a driving control device of the rail vehicle to receive the control signal and adapt the driving behavior of the rail vehicle according to the control signal.

8. The method according to claim 1, which further comprises determining a status signal as the reaction.

9. The method according to claim 1, which further comprises forming the track-side evaluation signal from a track-side obstacle signal indicating the obstacle.

10. The method according to claim 1, which further comprises determining at least one of the actual value or the target value of the at least one variable characterizing the effectiveness of the vehicle-side obstacle identification arrangement in dependence on an information item concerning an environment-related visibility prevailing at a current location of the rail vehicle.

11. The method according to claim 1, which further comprises using a track-side transfer arrangement to transfer the track-side evaluation signal from a communication unit of the track-side obstacle identification arrangement to a communication unit of the rail vehicle.

12. A system, comprising:
a track-side obstacle identification arrangement and a vehicle-side obstacle identification arrangement configured to identify obstacles in a danger zone in front of a rail vehicle;
the system being configured, on approaching a relevant item of the obstacles, to derive at least one reaction of the rail vehicle, in dependence on a track-side evaluation signal of said track-side obstacle identification arrangement and an actual value of at least one variable characterizing an effectiveness of said vehicle-side obstacle identification arrangement, wherein the at least one reaction of the rail vehicle is selected from the group consisting of determining and outputting a control signal to a driving control device to adapt a driving behavior of the rail vehicle based on the control signal; and determining and outputting a status signal to at least one component selected from the group consisting of a warning device and an alerting device;
the system also configured to determine the actual value in dependence on the information item indicating a type of the vehicle-side obstacle identification arrangement; and
the vehicle-side obstacle identification arrangement including a vehicle-side evaluating device configured for outputting an information item indicating the type of the vehicle-side obstacle identification arrangement;
the system configured to output, to the driving control device, the actual value and an associated target value of the at least one variable characterizing the effectiveness of the vehicle-side obstacle identification arrangement; and
the system configured to determine, with the driving control device, a deviation of the actual value from the associated target value, wherein the at least one reaction of the rail vehicle is determined dependent on the trackside evaluation signal and on the deviation.

13. The system according to claim 12, wherein the reaction is a control signal for adapting a driving behavior of the rail vehicle.

14. The system according to claim 13, wherein said vehicle-side obstacle identification arrangement is configured to form a vehicle-side evaluation signal from a vehicle-side obstacle signal indicating the obstacle.

15. The system according to claim 14, wherein the control signal is formed in dependence on the vehicle-side evaluation signal.

16. The system according to claim 13, wherein a driving control device of the rail vehicle is configured to receive the control signal and to adapt the driving behavior of the rail vehicle according to the control signal.

17. The system according to claim 12, wherein the reaction is a status signal.

18. The system according to claim 12, wherein said track-side obstacle identification arrangement is configured to form the track-side evaluation signal from a track-side obstacle signal indicating the obstacle.

19. The system according to claim 12, wherein said track-side obstacle identification arrangement includes a communication unit, and a track-side transfer arrangement is configured to transfer the track-side evaluation signal from said communication unit of said track-side obstacle identification arrangement to a communication unit of the rail vehicle.

* * * * *